US008877280B2

(12) United States Patent
Toledo

(10) Patent No.: US 8,877,280 B2
(45) Date of Patent: Nov. 4, 2014

(54) COMPOSITIONS FOR IMPROVING FLAVOR AND SAFETY OF MARINATED MEAT PRODUCTS

(75) Inventor: Mo Mui Toledo, Athens, GA (US)

(73) Assignee: Triad Resource Technologies, LLC, Athens, GA (US)

( * ) Notice: Subject to any disclaimer, the term of this patent is extended or adjusted under 35 U.S.C. 154(b) by 0 days.

(21) Appl. No.: 13/450,203

(22) Filed: Apr. 18, 2012

(65) Prior Publication Data

US 2012/0201950 A1 Aug. 9, 2012

Related U.S. Application Data

(62) Division of application No. 11/516,041, filed on Sep. 6, 2006, now Pat. No. 8,182,858.

(60) Provisional application No. 60/716,973, filed on Sep. 15, 2005.

(51) Int. Cl.
| | | |
|---|---|---|
| A23B 4/12 | (2006.01) | |
| A23L 1/318 | (2006.01) | |
| A23B 4/20 | (2006.01) | |
| A23L 1/22 | (2006.01) | |
| A23L 1/222 | (2006.01) | |

(52) U.S. Cl.
CPC ............... *A23L 1/3182* (2013.01); *A23B 4/12* (2013.01); *A23B 4/20* (2013.01); *A23L 1/22066* (2013.01); *A23L 1/2225* (2013.01)
USPC ............................. 426/562; 426/17; 426/650

(58) Field of Classification Search
CPC ........ A23B 4/12; A23B 4/20; A23L 1/22066; A23L 1/2225; A23L 1/3182
USPC ........................................................ 426/652
See application file for complete search history.

(56) References Cited

U.S. PATENT DOCUMENTS

| | | | |
|---|---|---|---|
| 1,955,864 A | | 4/1934 | Stevens |
| 2,417,806 A | | 3/1947 | Bauer et al. |
| 2,567,038 A | | 9/1951 | Stevens et al. |
| 3,389,567 A | * | 6/1968 | Bevarly et al. ................ 62/544 |
| 3,445,244 A | * | 5/1969 | Noznick et al. ............... 426/103 |
| 3,615,702 A | * | 10/1971 | Swisher ......................... 426/98 |
| 3,857,254 A | * | 12/1974 | Lobel ............................. 62/373 |
| 4,670,277 A | | 6/1987 | Brotsky et al. |
| 5,104,679 A | * | 4/1992 | Jurcso ........................... 426/602 |
| 5,124,162 A | | 6/1992 | Boskovic et al. |
| 5,158,794 A | | 10/1992 | Halden et al. |
| 5,302,406 A | | 4/1994 | Ludwig et al. |
| 6,056,984 A | | 5/2000 | Ekanayake et al. |
| 6,120,823 A | | 9/2000 | Cirigliano et al. |
| 6,284,303 B1 | | 9/2001 | Rowe et al. |
| 2002/0054941 A1 | | 5/2002 | Calkins et al. |
| 2002/0068113 A1 | | 6/2002 | Raczek et al. |

FOREIGN PATENT DOCUMENTS

| | | |
|---|---|---|
| EP | 0260623 A2 | 3/1998 |
| GB | 152946 A | 10/1920 |
| JP | 51-030160 B | 8/1976 |
| JP | 52-099294 A | 8/1977 |
| JP | 52-148698 A | 12/1977 |
| JP | 56-064772 A | 6/1981 |
| JP | 63-074470 A | 4/1988 |
| JP | 08-051957 | 2/1996 |
| JP | 09-500018 | 1/1997 |
| JP | 2000-000079 | 1/2000 |
| JP | 2003-250499 | 9/2003 |
| JP | 2003-334033 | 11/2003 |
| WO | 90/03118 A1 | 4/1990 |
| WO | WO 90/03118 | 4/1990 |
| WO | WO 95/02337 | 1/1995 |
| WO | WO 02/24003 A2 | 3/2002 |
| WO | WO 2005/034640 A1 | 4/2005 |

OTHER PUBLICATIONS

Brighenti: Effect of neutralized and native vinegar on blood glucose and acetate responses to a mixed meal in healthy subjects; Eur J Clin Nutr. Apr. 1995;49(4):242-7.*
Gonzfilez: Volatile components in Andalusian vinegars;Department of Nutrition and Food Science, Faculty of Pharmacy, University of Sevilla, E-41012 Sevilla, Spain; Z Lebensm Unters Forsch (1987) 185:130-133 © Springer-Vedag 1987.*
Rhodes: EP 0581880 A4; 1992.*
Katsue: JP Application #: 09-302762, published: May 25, 1999.*
Takao: JP Publication No. 01-179668), published: Jul. 17, 1989.*
Knizhnik: USPTO translator provides a translation of paragraph 0014 of JP 11-137171; Oct. 17, 2013.*
NMSU:http://web.archive.org/web/20040928185005/http://www.chemistry.nmsu.edu/studntres/chem116/notes/titrations.html; Sep. 28, 2004.*
Oreskovich: Marinade pH Affects Textural Properties of Beef; vol. 57, No. 2, 1992 Journal of Food Science.*

(Continued)

*Primary Examiner* — Patricia George
(74) *Attorney, Agent, or Firm* — Stroock & Stroock & Lavan LLP

(57) ABSTRACT

A composition for improving the flavor and juiciness of marinated meats and inhibiting growth of pathogenic and spoilage microorganisms and a process for making the composition are described. Lemon juice and vinegar are neutralized, concentrated and blended with non-neutralized lemon juice and non-neutralized vinegar in appropriate proportions to achieve the desired water binding and antimicrobial effects.

10 Claims, No Drawings

(56) References Cited

OTHER PUBLICATIONS

Helmenstine: What Is the Equation for the Reaction Between Baking Soda and Vinegar?; published online Aug. 2013; http://chemistry.about.com/od/chemicalreactions/f/What-Is-The-Equation-For-The-Reaction-Between-Baking-Soda-And-Vinegar.htm.*

Database WPI, Week 197804, Thompson Scientific, London, GB; AN 1978-07568A, XP002681780, & JP52-148698A (Nakano Su Ten) Dec. 10, 1977.

Database WPI, Week 197739, Thompson Scientific, London, GB; AN 1977-69907Y, XP002681781, & JP52-099294A (Nakano Vinegar Co. Ltd.) Aug. 19, 1977.

Database WPI, Week 197639, Thompson Scientific, London, GB; AN 1976-73330X, XP002681782, & JP51-030160B (Tamanoi Vinegar) Aug. 30, 1976.

Extended Search Report issued on Aug. 27, 2012 by the European Patent Office in European Patent Application No. 12004418.5.

Juneja: Inhibitory effects of organic acid salts on growth of *Clostridium perfringens* from spore inocula during chilling of marinated ground turkey breast; International Journal Food Microbiology 93 (2004) 155-163; Received Nov. 20, 2002; received in revised from Aug. 5, 2003; accepted Oct. 9, 2003.

Japanese Office Action, w/ English translation thereof, issued in Japanese Patent Application No. 2008-531172, dated Oct. 4, 2011.

Vedder, E. B., et al., "Solubilities of the Antiscorbutic Factor Present in Lemon Juice", Sep. 24, 1926, pp. 215-218, Medical Research Division, Chemical Warfare Service, Edgewood Arsenal, Edgewood, Maryland.

Japanese Office Action, with English translation, issued in Japanese Patent Application No. 2008-531172, mailed Aug. 31, 2010.

Venolia; Lemon juice particles. Some effects of juice processing; J. Agric. Food Chem., 1975, 24 (4), pp. 825-825; DOI: 10.1021/jf60206a039; Publication Date Jul. 1976.

Google Answers:http://answers.google.com/answers/threadview?id=334104; Apr. 22, 2004.

Hoogenkamp: Protein-enhanced: adding value using functional non-meat ingredients is an ideal marketing strategy for a variety of applications including retail products, foodservice menus, and case-ready solutions; Publication: The National Provisioner, Monday, Sep. 1, 2003.

Chinese Office Action, w/ English translation thereof, issued in Chinese Patent Application No. CN 200680034111.8 dated Jul. 12, 2010.

Xiong., et al., "Evaluation of tenderness in prawns (Machrobrachium rosenbergii) marinated in various salt and acid solutions", International Journal of Food Science and Technology, Mar. 2002, pp. 291-296, vol. 37, No. 3, Blackwell Science Ltd.

International Search Report and Written Opinion issued in corresponding International Patent Application No. PCT/US2006/034497 dated Feb. 26, 2007.

Chinese Second Office Action, w/ English translation thereof, issued in Chinese Patent Application No. CN 200680034111.8, dated May 17, 2011.

MACCO Organiques, Inc. Product Specification Sheet dated Dec. 16, 2003 for Sodium Diacetate FCC DF.

Sodium Diacetate specification published by the Food and Nutrition Paper 4 (1978) and Food Nutrition Paper 52 (1992) of the Joint FAO/WHO Expert Committee on Food Additives that is administered jointly by the Food and Agriculture Organization of the United Nations (FAO) and the World Health Organization (WHO).

* cited by examiner

COMPOSITIONS FOR IMPROVING FLAVOR AND SAFETY OF MARINATED MEAT PRODUCTS

RELATED APPLICATIONS

This application is a Divisional of U.S. application Ser. No. 11/516,041, filed on Sep. 6, 2006, which claims priority to U.S. Provisional Patent Application No. 60/716,973, filed on Sep. 15, 2005, the entire disclosure of which is incorporated herein by reference.

FIELD OF THE INVENTION

The invention relates to a composition for improving the flavor of and inhibiting microbial growth in marinated meats. More particularly, the invention relates to a composition comprising a combination of neutralized lemon juice and vinegar with non-neutralized vinegar in proportions effective to achieve the desired water binding and antimicrobial effects.

BACKGROUND OF THE INVENTION

Marination of meats is commonly practiced in the industry. The primary objective of marinating meat is to produce a product that is tender and moist when cooked. However, the major problems with marinated meat is its inability to retain water, which results in a pooling of marinade in the package of raw meat in the retail case, and high cook losses, which result in a cooked product that is tough and dry. To counter these problems, meat processors use several different ingredients in marinade to enhance retention of the marinade in the meat, the most important of which are salt and phosphate, and extenders such as starches, flour, maltodextrin, soy protein and whey or milk proteins.

A recent trend in the food industry is the omission on food labels of chemically descriptive words in the list of declared ingredients and non-meat binders. Terms such as phosphate, lactate, citrate, and acetate connotes manufactured chemical compounds, and starch, flour, soy protein, and dairy proteins connotes dilution of meat with low-cost ingredients. In addition, the latest ruling by FDA on allergens requires the listing on the label of allergens such as wheat flour, peanut, soy, and dairy products. Thus, meat processors have been removing ingredients that may not be considered "consumer friendly" and substituting ingredients that can be considered natural as defined by the USDA/FSIS. Ideally, processors would like to have an "all natural" claim on the product label.

A number of USDA/FSIS approved compounds are now used in meat marinades to improve marinade retention, flavor, and antimicrobial effects. Compounds that are listed in Amendment 3, of FSIS directive 7120.1, as "safe and suitable for use in meats and poultry include: salt, phosphate, sodium lactate, sodium diacetate, citric acid, and sodium bicarbonate. Grapefruit and lemon extracts are also listed, but extracts as defined in the regulations are solvent (ethanol) extracted components of lemon or grapefruit used primarily to impart the citrus flavor.

Citric acid is the predominant acid in citrus juices and is present at a high concentration in lemon juice. When lemon juice is added to meats, it may be declared on the label as lemon juice. Citric acid is also produced by fermentation of sugars or starches by a mold. When produced by fermentation, citric acid must be declared as citric acid in the label. Acetic acid is the acid in vinegar, but since vinegar is a common ingredient used widely in domestic cookery, vinegar can be listed on the label as "vinegar" modified by source, e.g. "distilled white vinegar" or "apple cider vinegar," rather than the chemical name, acetic acid.

The pH of a marinade, which is a measure of its acidity, depends on the type and concentration of ingredients in the formula. It is important that the pH of meat after marination be in the range of 5.8, to 6.2. When meat pH drops below 5.8,, it loses its water holding capacity, absorption of marinade is minimal, and liquid is released during refrigerated storage and/or cooking. When meat pH after marination is higher than 6.0,, meat retains water very well, and, therefore, added marinades are absorbed by the meat and retained in the meat through storage and cooking. However, when pH is higher than 6.2, an alkali-like taste may be perceived on the tongue and the lining of the mouth. In addition, the meat pigments become more stable to heat, the bloody red color persists even when the meat temperature exceeds the cooking end point temperature of 165°, F. when the meat is considered well done. Thus a successful marinade must not allow the marinated meat pH to be outside the pH range between 5.8, and 6.2.

Thus there is a need for marinades for raw meat that contain natural ingredients and which achieve a pH of the marinated meat in the range of from about 5.8, to about 6.2.

SUMMARY OF THE INVENTION

In one aspect of the invention there is provided a composition comprising neutralized lemon concentrate having a pH of from about 6.5, to about 7.2. The composition may be in either liquid or powder form, preferably a dry powder, and may further comprise an anti-caking agent and/or filler.

In another aspect of the invention there is provided a composition comprising a neutralized vinegar concentrate comprising an equimolar ratio of acetic acid to sodium acetate.

In a further aspect of the invention there is provided a composition for treating raw or ready-to-eat meat comprising a neutralized lemon concentrate having a pH of from about 6.5 to about 7.2, and a neutralized vinegar concentrate comprising an equimolar ratio of acetic acid to sodium acetate, wherein the ratio of neutralized lemon to neutralized vinegar is between about 1:1, to about 6:1.

The invention also provides a marinated meat product comprising a neutralized lemon concentrate having a pH of from about 6.5, to about 7.2, and a neutralized vinegar concentrate comprising an equimolar ratio of acetic acid to sodium acetate, wherein the meat product contains about 1.4, to about 2.4% of the neutralized lemon and neutralized vinegar concentrate based on the marinated meat product weight.

In yet another aspect of the invention there is provided a method of treating a raw or ready-to-eat meat product to enhance flavor and retain water during refrigeration and cooking comprising applying to the meat product a marinade comprising a neutralized lemon concentrate having a pH of from about 6.5, to about 7.2, and a neutralized vinegar concentrate comprising an equimolar ratio of acetic acid to sodium acetate.

In another aspect of the invention, there is provided a method of preparing a neutralized lemon concentrate comprising treating a lemon concentrate with an amount of neutralizing agent sufficient to completely neutralize the lemon concentrate and achieve a pH of the concentrate of about 6.8, to about 7.2, and adjusting the pH of the concentrate with untreated lemon concentrate to a pH of about 6.5, to about 7.2. In a preferred embodiment of this aspect of the invention, an effective amount of an anti-caking agent and/or a filler are added to the neutralized lemon concentrate.

In another aspect of the invention there is provided a method of preparing a neutralized vinegar concentrate comprising treating vinegar with an effective amount of a neutralizing agent to completely neutralize the vinegar; concentrating the neutralized vinegar by removing water therefrom; and adding an effective amount of untreated vinegar to the concentrated neutralized vinegar to obtain an equimolar ratio of sodium acetate to acetic acid.

In yet another aspect of the invention there is provided a method of preparing a composition for treating raw meat or ready-to-eat comprising mixing a neutralized lemon concentrate having a pH of from about 6.5, to about 7.2, and a neutralized vinegar concentrate comprising a molar ratio of acetic acid to sodium acetate in the range of about 1:1, to about 1:1.2, wherein the ratio of neutralized lemon to neutralized vinegar is between about 1:1, and about 6:1, by weight.

DETAILED DESCRIPTION OF THE INVENTION

A problem with using lemon juice and vinegar directly on meat as a marinade is the effect of the acidity on the marinated meat pH. Thus, although lemon is listed in the FSIS list of approved additives to meat, it is listed as a lemon extract, indicating that it is primarily the lemon peel extract, rather than the juice that is used.

The present invention has solved the problems associated with use of lemon in marinades by manipulating the acidity and ratios of three natural components of the marinade. The present invention provides a marinade for raw and ready-to-eat meat products which has both high water binding potential and antimicrobial properties.

The novelty of this invention is embodied in the treatment of the vinegar and lemon juice before mixing to produce a marinade ingredient in which the lemon and vinegar flavor can be modulated and the pH of the marinated meat can be controlled to maximize marinade retention and antimicrobial properties. Another novel feature of this invention is the process by which the acetate concentration in the mixture is increased, resulting in a marinade mix which does not permit the growth of molds, yeast, or bacteria during storage and distribution in the liquid form at ambient temperature. A third novel feature is the pre-treatment of the lemon concentrate by converting the citric acid into a salt, thus facilitating dehydration by spray drying or vacuum belt drying to produce a non-caking dry ingredient.

In one aspect, the present invention provides shelf-stable, all natural meat marinade ingredients in liquid or powder form, manufactured from lemon juice and/or vinegar, which enhance water binding in meats, impart improved flavor and retard growth of spoilage and pathogenic microorganisms during refrigerated storage and distribution of the meat product. The meat marinade ingredients of the invention may be in the form of a liquid Lemon/Vinegar Mix, a Non-Caking Dry Lemon Powder, or a liquid Vinegar Mix.

In another aspect of the invention, there is provided a manufacturing process for a marinade ingredient to be used in marinades to achieve the desired marinade binding and inhibition of growth of spoilage and pathogenic microorganisms.

The shelf-stable liquid Lemon/Vinegar Mix marinade ingredient of the invention contains partially neutralized lemon juice concentrate and partially neutralized, concentrated distilled vinegar. We discovered that consistency in obtaining the correct pH of the Lemon/Vinegar mix is best obtained by fully neutralizing the lemon juice with sodium bicarbonate, or other neutralizing agent, to a pH of about 6.8, to about 7.2, and adding back un-neutralized lemon juice to obtain the desired pH, which is preferably between about pH 6.5, and 7.2. The same procedure is used with the vinegar component of the marinade ingredient. Sodium bicarbonate is on the list of approved safe and suitable compounds for use in meat and poultry products. Therefore it is the preferred agent to neutralize the acids in lemon juice and vinegar. However, other neutralizing agents, such as sodium hydroxide, potassium hydroxide, and potassium bicarbonate may also be used to neutralize the lemon and vinegar but their use will have to be approved by USDA/FSIS before the neutralized lemon and vinegar can be used in meat products.

The Vinegar Mix contains about 30, to about 50% of an equimolar ratio of acetic acid and acetic acid salt and preferably in the range of about 40, to about 45% because at the high concentration the acetic acid salt will crystallize during storage and at the lower concentration too much water will be introduced when the vinegar mix is added to the neutralized lemon resulting in a water activity above 0.85. The moles of acetic acid salt are preferably about 10, to about 20% greater than the moles of acetic acid to provide a buffering action to maintain the desired pH.

The pH of a mixture of sodium acetate and acetic acid is defined by the Henderson-Hasselbach equation as follows: pH=$pK_a$+log ([sodium acetate/acetic acid). The $pK_a$, of acetic acid is 4.76. Thus, if an equimolar ratio of sodium acetate and acetic acid is present, the pH of the solution will be the $pK_a$. When the concentration of sodium acetate is greater than that of acetic acid, the second term in the Henderson-Hasselbach equation will be a positive quantity which increases the pH above the $pK_a$. For example if the molar ratio of sodium acetate to acetic acid is 1.2,, the pH of the solution will be 4.83. The small change in pH with changes in the concentration of acid is called the buffering capacity and the presence of an excess of sodium acetate over the acetic acid in the vinegar mix aids in maintaining the desired marinade pH when the composition is used in a meat marinade.

The equimolar acetic acid/acetate salt is the "active antimicrobial component" and the amount added to the marinade is preferably sufficient to exhibit an antimicrobial property. The active antimicrobial component of the Vinegar Mix preferably is present in the marinated product at a level of about 0.2, to about 0.5% by weight.

Lemon juice solids that are added either as the liquid Lemon/Vinegar Mix or the Lemon Powder component are preferably present in the meat at a level of about 1.5, to about 2% to achieve the desired water binding and inhibitory antimicrobial activity. These requirements define the ratio of the lemon juice component and the vinegar component that are mixed together to produce the Lemon/Vinegar Mix. The actual weight ratios are determined by the percentage of acetic acid and acetic acid salt in the vinegar component and the solids content of the lemon juice component.

In order to avoid spoilage of the Lemon/Vinegar Mix during storage at ambient temperature, the Vinegar Mix preferably is added to the lemon juice in a ratio of about 1, part Vinegar Mix to about 1, to about 6, parts of the Lemon juice component, and water in the Vinegar component is preferably minimized such that the water activity of the Lemon/Vinegar mix is about 0.85, or below. Since commercially available vinegar contains a maximum of 30% acetic acid, the neutralized vinegar is concentrated by heating for example, to remove water before mixing with the unreacted vinegar to obtain the Vinegar Mix. The neutralized vinegar can be concentrated by any method that removes water.

In order to prevent separation of the serum phase from the solid phase in the mixture of pH adjusted lemon concentrate and pH adjusted vinegar, the viscosity of the vinegar component may be increased by the addition of starch, for example to heated unreacted vinegar prior to mixing with the concentrated reacted vinegar. The vinegar-starch mixture is then cooled to ambient temperature and mixed with the pH-adjusted lemon concentrate.

Preparation of the Neutralized Lemon:

Lemon juice concentrate containing about 400, grams per liter (gpl) of citric acid is preferably used in the process of making a neutralized lemon component of the marinade ingredient. A higher concentration may be used, but if viscosity is very high the concentrate is preferably diluted. At lower concentrations, there may be too much water present, resulting in a water activity above 0.85, making the product subject to spoilage when stored at ambient temperature. The process of neutralization involves the addition of a neutralizing agent, such as sodium bicarbonate powder to the lemon concentrate. The chemical reaction is as follows:

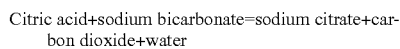
Citric acid+sodium bicarbonate=sodium citrate+carbon dioxide+water

Carbon dioxide is entrained in the concentrate to produce a foam. The foam consistency can be as thick as the consistency of shaving cream. The thick viscosity of the foam makes high speed mixers ineffective to mix the reaction mixture. A slow moving mixer which scrapes both sides and bottom of the reaction vessel is more effective. Generally, the more viscous the concentrate, the longer it takes for the foam to collapse. Therefore, a lower amount of the reaction mixture can be used in a particular size vessel. We discovered that heating the concentrate to 50° C. before adding the sodium bicarbonate accelerates the reaction and minimizes the volume rise of the foam. Temperature during the reaction which could take at least one hour, is preferably maintained below 50° C. Otherwise the lemon concentrate discolors and may acquire a bitter off-flavor.

Preferably a lower concentration of lemon concentrate with a water activity higher than 0.85, is not be used; otherwise the product will spoil when stored at ambient conditions.

The amount of sodium bicarbonate needed to completely neutralize the citric acid is in the range of about 0.36, to about 0.46, pounds per pound of lemon concentrate, preferably about 252, parts sodium bicarbonate to about 192, parts citric acid or about 1.31, parts sodium bicarbonate to about one part of citric acid by weight. The latter is the stoichiometric ratio for acid neutralization. Anything less will result in un-neutralized acid lowering the pH below the desired value. Anything more will result in unreacted sodium bicarbonate which can later react with the vinegar mix altering the acetic acid/acetic acid salt ratio. We discovered that adding all the sodium bicarbonate at one time results in a very large volume of foam, which may run out of the reaction vessel. In addition, the unreacted sodium bicarbonate settles to the bottom of the reaction vessel and forms a cake and would not be available to complete the neutralization reaction. It is also preferable to meter the sodium bicarbonate into the reaction vessel at such a rate that the foam produced is maintained at a level well within the volume of the reaction vessel. When the reaction is complete, foam generation stops and the foam settles resulting in a liquid with the same consistency as the original lemon concentrate. Density of the reacted lemon concentrate is slightly higher than that of the original lemon concentrate once the foam has completely collapsed. The neutralized lemon concentrate has a pH of about 6.8, to about 7.2. The pH may be adjusted to about 6.5, to about 7.2, by the addition of the original lemon concentrate. The resulting liquid may be dried to produce a Dry Lemon Powder or mixed with the Vinegar Mix to produce a Lemon/Vinegar Mix.

Commercial lemon juice concentrate is standardized to a specific citric acid content expressed in grams per liter of citric acid. Different sources of lemon will have different levels of non-acid components and therefore will have different densities. The easiest way to determine the exact citric acid content of the concentrate as a percentage by weight of citric acid is to determine the density in g/cc and dividing the gpl by 1000, times the density. Thus, if the 400, gpl lemon concentrate has a density of 1.24, g/cc the % citric acid is 400/1240=0.322 or 32.2% (w/w). The active component in the lemon mix responsible for water binding and antimicrobial properties is the citric acid salt and the non-acid solids in the concentrate. If this concentrate has a total solids content of 48%, non-acid solids will be 49−32.2=15.8. The acid salt will be 32.2×, molecular weight of sodium citrate/molecular weight of citric acid=32.2×258/192=43.3. The mass of the neutralized lemon from 100, pounds of concentrate (determined as the sum of the mass of concentrate plus sodium bicarbonate less carbon dioxide) is 120, lb. Thus, the percentage active component in the neutralized lemon concentrate is (43.3+15.8)/120=0.49, or 49%. Since the density and non-acid content of the lemon juice concentrate can vary with different batches, it will be necessary to obtain the density and total solids content to determine the concentration of active components in the neutralized lemon.

Preparation of Vinegar Mix

The Vinegar Mix is preferably produced from 300, grain vinegar, although vinegar having a grain value of about 200, to about 300, may be used. If the Vinegar Mix is used separately instead of being mixed with the neutralized lemon to make the Lemon/Vinegar Mix, then a concentration of acetic acid in the vinegar below 200, grain is of no consequence. The lower concentration of the active component in the Vinegar Mix made from a lower grain vinegar can be compensated by the use of more of the Vinegar Mix in the marinade. However, when added to the neutralized lemon to make the Lemon/Vinegar Mix, the lower grain vinegar product will raise the water activity of the mix resulting in spoilage when stored at ambient temperature.

The vinegar is neutralized with a neutralizing agent such as sodium bicarbonate according to the following reaction:

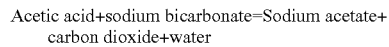
Acetic acid+sodium bicarbonate=Sodium acetate+carbon dioxide+water

The reaction is preferably carried out at room temperature to avoid release of volatile acetic acid to the environment. The foam produced by this reaction is of low viscosity and the foam readily collapses. However, the reaction is rapid so that if all the sodium bicarbonate is added at one time, the reaction mixture may overflow from the reaction vessel. The amount of sodium bicarbonate needed for the reaction is about 84 parts of sodium carbonate to 60 parts of acetic acid or 1.4 parts sodium bicarbonate per part of acetic acid, by weight. This is a stoichiometric ratio that should be met for ease in processing. If more sodium bicarbonate is added than the stoichiometric ratio, the excess will remain in the solution and can interfere with heating during the process of evaporation. In addition, unreacted sodium bicarbonate will react with the vinegar added back to the hot concentrated neutralized vinegar causing a dangerous, violent generation of foam. Sodium bicarbonate added in an amount less than the stoichiometric ratio results in unreacted acetic acid which will be wasted by evaporating with the water during the concentration process. Sodium bicarbonate is preferably added slowly to avoid overflowing the foam out of the reaction vessel.

At the completion of the reaction, the neutralized vinegar can be concentrated by heating to evaporate the water, for example. Since sodium acetate is not volatile, only water will be removed from the neutralized vinegar by evaporation. The sodium acetate however, hydrolyzes to acetic acid and sodium hydroxide in the presence of water. Therefore, it is preferable to apply suction over the evaporator using a liquid ring seal pump to trap the volatiles and dispose of it into the sewer system, rather than into the atmosphere.

Evaporation removes water and the volume is reduced until about ⅖, to about ⅗, of the original mass remains. The endpoint is manifested by the formation of a very thin layer of crystalline material on the surface of the liquid. Load cells on the evaporator can be used to determine when the endpoint is reached. It is better to over-concentrate and add back water later than to under-concentrate because the latter results in a lower concentration of the active ingredient while the former allows room for adjustment by the addition of water.

Preferably, the concentrated neutralized vinegar is not allowed to cool down before adding back the unreacted vinegar. The sodium acetate will crystallize out of solution forming a hard cake or crystal clumps which is very difficult to disperse in the succeeding operations. A stable, completely homogeneous mixture is produced by adding back the unreacted vinegar to the neutralized vinegar concentrate. To obtain an equimolar ratio of acetic acid to sodium acetate, the amount of vinegar added back is equal to the amount of vinegar used in the preparation of the neutralized vinegar. For example, if 100 lbs of 300 grain vinegar is reacted with sodium bicarbonate, a material balance (lb product=lb vinegar+lb sodium bicarbonate−lb carbon dioxide) will show that 120, lbs of reacted vinegar will be produced. Thus, for every 120, lbs of reacted vinegar that was concentrated, about 100, lbs of unreacted vinegar is added to produce the equimolar ratio. However, since an excess of 10, to 20% of the acetic acid salt over the acetic acid is desired, the amount of vinegar added back is 80, to 90, pounds instead of 100. If the reacted vinegar was concentrated to 50% of its original mass, and 90, pounds of the vinegar is added back, the Vinegar Mix will have a mass of about 150, pounds. This Vinegar Mix has a concentration of active ingredient of about 45.3%. If on the other hand, the neutralized vinegar was concentrated to 40% the original mass and 90, pounds of vinegar is added back, the yield of the Vinegar Mix is about 138 pounds and the concentration of active ingredient is about 49.3%. The latter can be diluted with water (about 12, lbs) to bring the mass back to about 150, lbs to have the same concentration of active ingredients of about 45.3% as in the previous 50% concentrate.

Preparation of the Lemon/Vinegar Mix

The concentration of the active component of the Vinegar Mix required to inhibit microorganisms in raw meats ranges from about 0.10, to 0.25%, when used with the neutralized lemon product at a concentration of the active ingredient from lemon of 0.6, to 0.90%. If the active component of the Vinegar Mix is 44%, about 0.22, to about 0.56% of the Vinegar Mix is required to inhibit microorganisms. On the other hand, with lemon containing about 49% active ingredient, 1.2% to 1.8% is required. The ratio of neutralized lemon to Vinegar Mix in the liquid Lemon/Vinegar Mix is preferably between 1, parts lemon to 1, part Vinegar Mix to 6, parts lemon to 1, part Vinegar Mix by weight.

The Lemon/Vinegar Mix preferably has a water activity below 0.85, and a pH between 5.6, and 5.8, for it to remain stable at room temperature.

Usage level of the liquid Lemon/Vinegar Mix in the marinated product is preferably about 1.4, to 2.4% of marinated product weight. Selection of the actual concentration is based on flavor impact, cost and degree of protection against microbiological activity required by the specific applications. More inhibitory activity against microorganisms is exhibited by product containing a lower Lemon to Vinegar Mix ratio and a higher Lemon/Vinegar Mix concentration in the product. However, the higher the vinegar concentration the more pronounced the vinegar flavor.

Preparation of Non-Caking Dry Lemon Powder

Non-Caking Dry Lemon Powder may be produced by drying the neutralized lemon using a spray drier or a vacuum drum drier, for example and adding a filler and anti-caking agent to the dried powder. Examples of suitable fillers and anti-caking agents include rice starch, rice flour, tapioca starch or potato starch used with or without sodium aluminate or silica gel. The neutralized lemon is less hygroscopic and is more heat tolerant than raw lemon concentrate. Therefore no additional processing aids are needed during the drying process.

After the dried powder has cooled down to ambient temperature it is blended with rice flour, rice starch, tapioca starch, potato starch, or the like in a 1:1, ratio. An anti-caking agent such as silica, bentonite, talc, or sodium aluminate may be added at an amount of about to about 0.005, to 0.1%, preferably about 0.01% to prevent caking during storage.

The active component in the Non-Caking Dry Lemon Powder is the solids component of the lemon concentrate and the salt of the citric acid. This active component constitutes about 50% of the Non-Caking Dry Lemon Powder. When used in marinades, the Non-Caking Dry Lemon Powder is added at about 1.5, to about 2.5% of the marinated meat weight. The powder by itself has excellent water binding properties and can be used to replace phosphate in marinades.

Marinades Utilizing the Non-Caking Dry Lemon Powder and Vinegar Mix

In order to have antimicrobial effects, a combination of the Non-caking Dry Lemon Powder and the Vinegar Mix are used in marinades. The liquid Vinegar Mix can be added directly to the marinade. The percentages of the Non-Caking Dry Lemon Powder and the Vinegar Mix in the marinated meat is the same as with the Lemon/Vinegar Mix

EXAMPLES

The percentage of ingredient in the marinated product in these examples is defined as follows:

% in product=(lb marinade absorbed/pound meat)(% ingredient in marinade)/(1+, lb marinade absorbed). When formulating marinades, set a target marinade absorption expressed as lb marinade/lb meat. For a set target % marinade ingredient in the product, the % ingredient in the marinade=% in product×[(1/target absorption)+1)]. For example, if target marinade absorption is 0.2,, and a 1.5% marinade ingredient level is desired in the product, % ingredient in marinade=1.5 (1/0.2+1)=9.0%.

Example 1

Whole chicken was injected with marinade to 14.5% of neat weight. Marinade was formulated to give 1.2% of the Lemon/Vinegar Mix in the meat and 1.24% of a savory pre-mixed salt and spice mix. Control consisted of the same salt and spice ingredient without the Lemon/Vinegar Mix. The chickens were packaged 6, to a plastic bag and stored at 36°, F. in a walk-in cooler. After 11, days, chicken injected with the marinade with the Lemon/Vinegar Mix had an average count of 4.46, log CFU/in2,, while chickens injected with the control marinade had an average count of 5.92, log CFU/in2. After 14, days, the chickens marinated with the Lemon/Vinegar Mix had an average count of 5.04, log CFU/in2, while those injected with the control marinade had an average count of 6.35, log CFU/in2, and exhibited a putrid smell. The Lemon/Vinegar Mix extended the refrigerated shelf-life by at least 3, days at 36° F.

Example 2

Raw beef sirloin tips were marinated to a 10% pick-up of the marinade, by vacuum tumbling. The marinade composition was calculated to provide 1.2% of the Lemon/Vinegar Mix in the meat along with 2% of a salt-spice seasoning blend. Control contained only the salt-spice seasoning blend. Each piece was placed inside stocking nets and cooked in the smoke house to an internal temperature of 155° F. After cooking, the nets were stripped off and individual pieces were packaged inside plastic bags and stored at 34° F. The following are the microbial counts in samples. After Week 1,, Control had 2, log CFU/g and the Lemon/Vinegar Mix marinated product had 2, log CFU/g. At week 8,, the control had 5.9, log CFU/g while the product marinated with the Lemon/Vinegar Mix had 3.3, log CFU/g. The lemon/vinegar mix extended the refrigerated shelf-life by at least 3, weeks.

Example 3

Boneless raw chicken breast meat was marinated to 15% of meat weight by vacuum tumbling. The Test marinade provided 1.4% of the Dry Lemon Powder; 0.5% rice flour, 0.5% maltodextrin, 0.3% of Vinegar Mix, and 0.8% salt in the marinated product. The control marinade provided 1.5% rice flour, 0.5% maltodextrin, and 0.8% salt in the marinated product. The marinades were pre-mixed in water and added to the meat in the tumbler. Individual breast pieces were packed in cryovac bags and sealed with <−0.2, bar pressure. Samples were stored at 35° F. On day 1,, counts were 3.4, log cfu/g for Control while Test samples had 2.65, log CFU/g. On day 8,, Control had 4.4, log cfu/g while Test samples had 2.6, log cfu/g. Control samples were putrid at 18, days while Test samples exhibited no off odor and had counts of 3.97, log cfu/g. Test samples did not show signs of spoilage until 25, days in storage. Meat marinated with the Dry Lemon Powder and Vinegar Mix extended the refrigerated shelf-life by at least 7, days.

Example 4

The Non-Caking Dry Lemon Powder was used in a marinade and used to marinate chicken breast extracted from spent (old) hens. Marination was by vacuum tumbling at 25, in. vacuum for 25, min. at 33° F. Marinades were mixed with ingredient levels calculated for a marinade absorption of 20% of meat weight. Meat was chilled to 33° F. and marinade was cooled to 28° F. before placing in a pre-chilled tumbler. Control marinade provided 0.8% salt, 0.4% sodium tripolyphosphate, and 1.5% rice flour in the marinated product, with the balance, water. Test marinade provided 0.8% salt, 1.5% rice flour, 0.8% Dry Lemon Powder in the marinated product with the balance, water. Marinade absorption was excellent in both marinated products and the amount of purge after 24, h at 36° F. was identical in the two samples, at less that 0.5% of marinated meat weight. Products were cooked in a smoke house with maximum steam addition at 180° F. to an internal temperature of 160° F. Yield was slightly better for the Test marinade at 108% of green weight compared to 102% for the Control. More importantly, the Test samples were jucier and more tender compared to the. Control. The Dry Lemon Powder served as an excellent replacement for phosphate, and also tenderized the product.

Example 5

Enhancement of the water binding properties of meat containing a formulation of the invention increases with increasing pH of the formulations, while decreasing pH increases the antimicrobial effects. When applied to boneless turkey breast, a formulation of lemon and vinegar in a 3:1, ratio of neutralized lemon concentrate to pH adjusted vinegar concentrate resulted in 91.4% retention in the raw meat of marinade applied at 15% of meat weight. Final cooked yield was 83% of the weight of un-marinated meat and shelf-life of the raw meat was over 49, days at 4° C. By comparison, the control which was marinated only with phosphate and salt retained in the raw meat 85.8% of marinade, the cooked yield was 79.1% of green weight and the shelf life was only 15, days at 4° C. Sensory panelists preferred the product containing the lemon-vinegar formulation over the control and those with the pH adjusted vinegar only.

The effect of the marinades of the invention on the water binding properties of chicken meat was tested. A marinade containing pH adjusted lemon and vinegar did not alter water binding properties of boneless-skinless chicken breast in comparison to a control marinade containing only salt and phosphate. Yields on marinades applied at the 20% level were 87.4% of applied marinade in the raw meat, while the cook yield was 93% of un-marinated meat weight. Shelf-life was 22, days. In comparison, marinade retention of the control marinade in raw meat was 87.2% and cook yield was 89.4% of un-marinated meat weight. However, the control spoiled after only ten days in storage at 4° C. Sensory panelists preferred the meat marinated with the lemon-vinegar formulation over the control and the product marinated with the pH-adjusted vinegar only.

Similar results were found on boneless pork loins marinated and cut into "chops." For chops marinated at the 15% level, marinate retention in the raw meat was 92.3% of added marinade for meats marinated with the pH-adjusted lemon-vinegar formulation compared to 83.5% for control pork chops marinated with salt and phosphate only. Cooked yield was 100% and 87.7% of green weight, respectively. Shelf-life was 31, days for the control and those marinated with the pH-adjusted lemon-vinegar formulation were still highly acceptable at 35, days.

What is claimed is:
1. A buffered concentrated vinegar mix, comprising the combination of:
  1) a first component prepared by:
    a) providing an amount of a first vinegar;
    b) completely neutralizing the acetic acid of the first vinegar by adding a neutralizing agent thereto, said neutralizing agent added in a stoichiometric ratio relative to the acetic acid such that all the acetic acid in the first vinegar is reacted with the neutralizing agent to form an acetate salt, and there is essentially no excess of neutralizing agent or unreacted acetic acid left; and
    c) concentrating the result of b) by evaporating water therefrom, until about ⅖ to about ⅗ of its original mass remains; and
  2) a second component comprising a second vinegar, added to the first component in an amount sufficient to obtain a desired pH,
  wherein the combination of the first component and the second component comprises a molar amount of acetate salt in excess of a molar amount of acetic acid in the combination, and the combination is suitable for use as a meat marinade.

2. The buffered concentrated vinegar mix of claim 1 wherein the first vinegar has a grain value of 300.

3. The buffered concentrated vinegar mix of claim 1 wherein the result of b) is concentrated to ⅖ of its original mass by the evaporation of water.

4. The buffered concentrated vinegar mix of claim 1 wherein the neutralizing agent comprises sodium bicarbonate.

5. The buffered concentrated vinegar mix of claim 1 wherein the second vinegar has a grain value of 300.

6. The buffered concentrated vinegar mix of claim 1, wherein the neutralizing agent comprises potassium bicarbonate.

7. The buffered concentrated vinegar mix of claim 1, wherein said concentrating comprises heating the result of b) to evaporate the water therefrom.

8. The buffered concentrated vinegar mix of claim 7, wherein the second component is added to the first component before the first component cools down and forms crystallized acetate salt.

9. The buffered concentrated vinegar mix of claim 1, wherein said concentrating comprises evaporating the water under applied suction.

10. A method of making a buffered concentrated vinegar mix, comprising combining:

1) a first component prepared by:
   a) providing an amount of a first vinegar;
   b) completely neutralizing the acetic acid of the first vinegar by adding a neutralizing agent thereto, said neutralizing agent added in a stoichiometric ratio relative to the acetic acid such that all the acetic acid in the first vinegar is reacted with the neutralizing agent to form an acetate salt, and there is essentially no excess of neutralizing agent or unreacted acetic acid left; and
   c) concentrating the result of b) by evaporating water therefrom, until about ⅖ to about ⅗ of its original mass remains; and 2) a second component comprising a second vinegar, added to the first component in an amount sufficient to obtain a desired pH, wherein the combination of the first component and the second component comprises a molar amount of acetate salt in excess of a molar amount of acetic acid in the combination, and the combination is suitable for use as a meat marinade.

* * * * *